J. SACHS.
SERVICE AND METER TESTING AND CONNECTION BLOCK.
APPLICATION FILED DEC. 14, 1914.
1,170,112.
Patented Feb. 1, 1916.
6 SHEETS—SHEET 2.
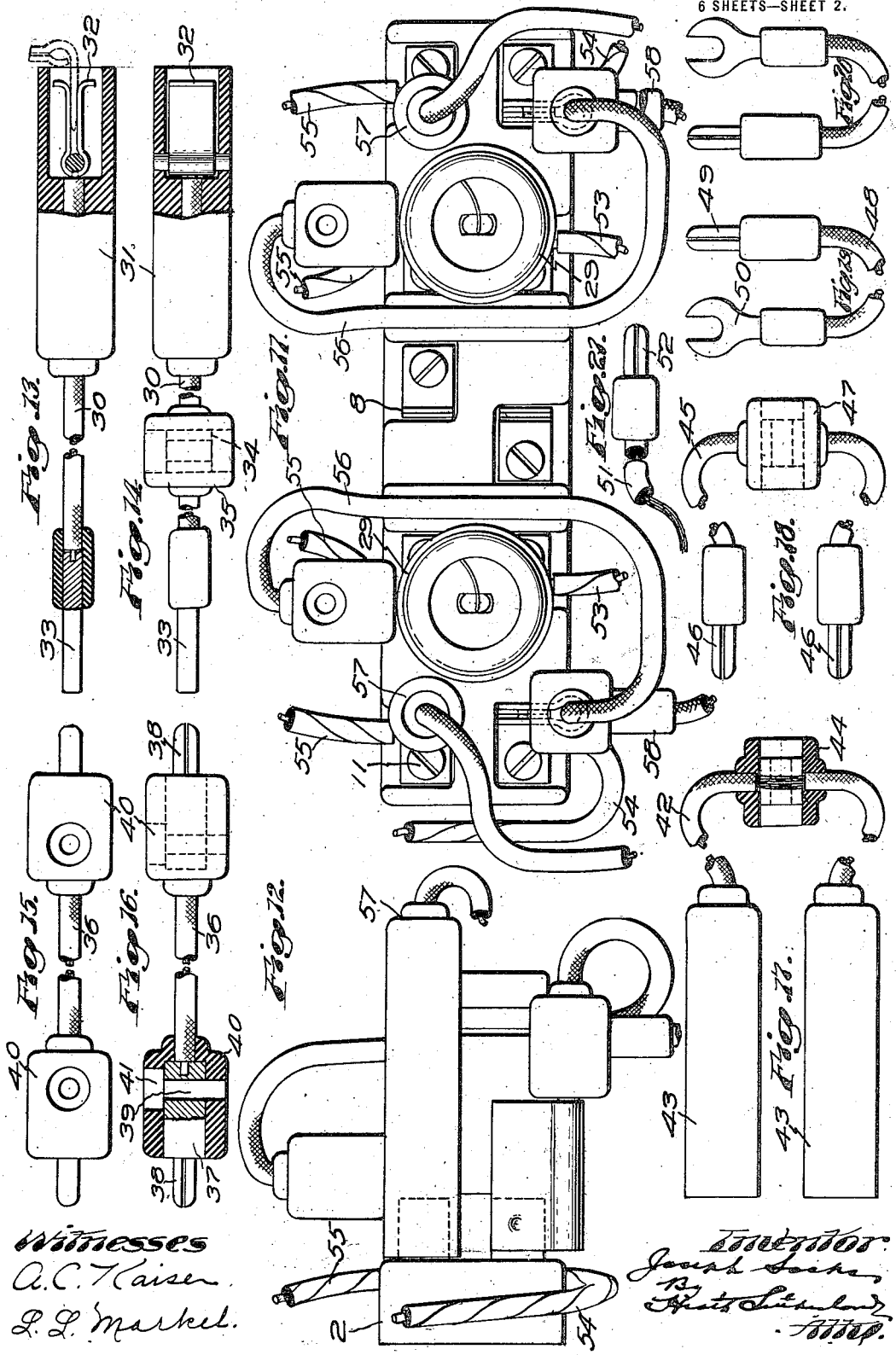

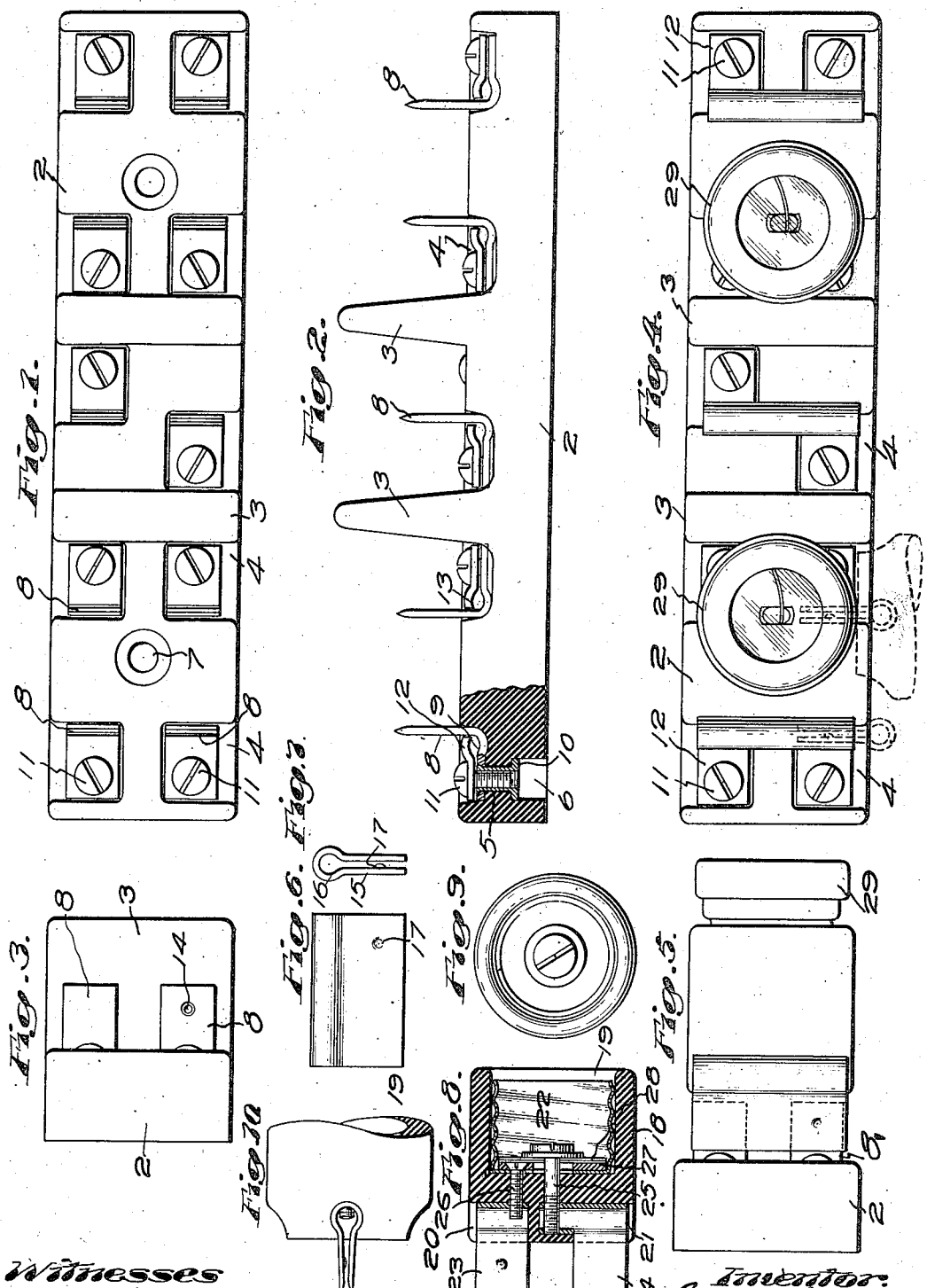

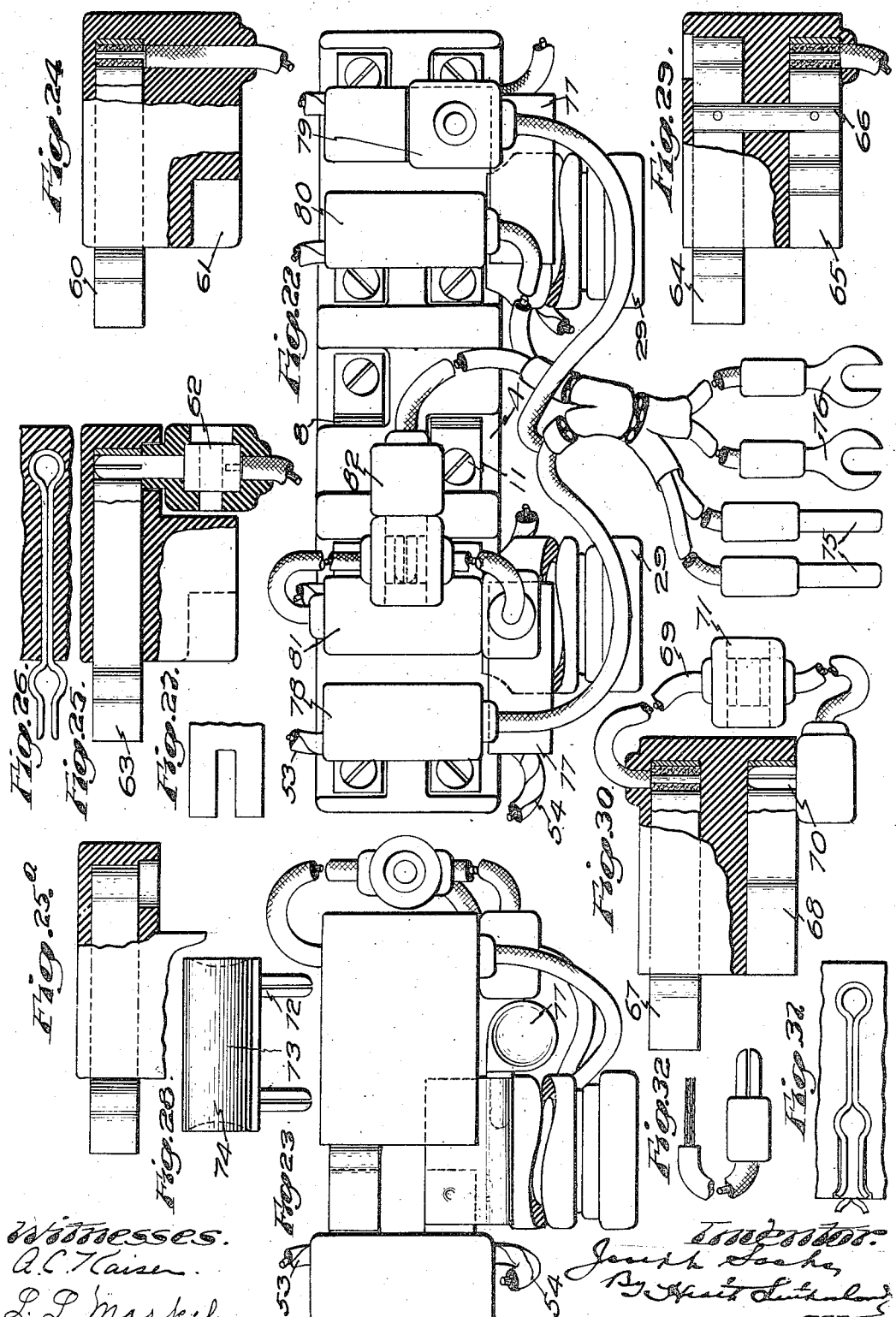
J. SACHS.
SERVICE AND METER TESTING AND CONNECTION BLOCK.
APPLICATION FILED DEC. 14, 1914.
1,170,112.
Patented Feb. 1, 1916.
6 SHEETS—SHEET 3.

J. SACHS.
SERVICE AND METER TESTING AND CONNECTION BLOCK.
APPLICATION FILED DEC. 14, 1914.
1,170,112.
Patented Feb. 1, 1916.
6 SHEETS—SHEET 4.
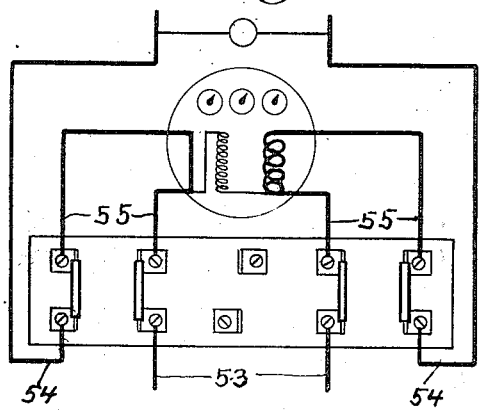
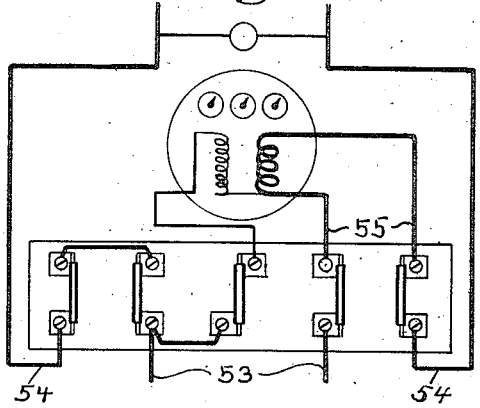
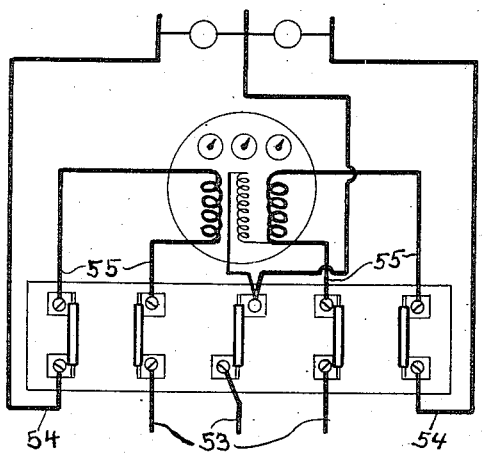
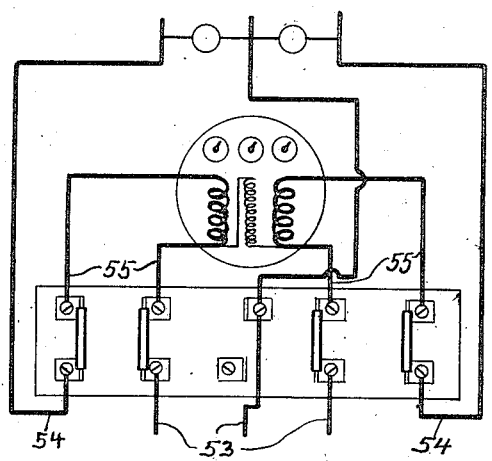
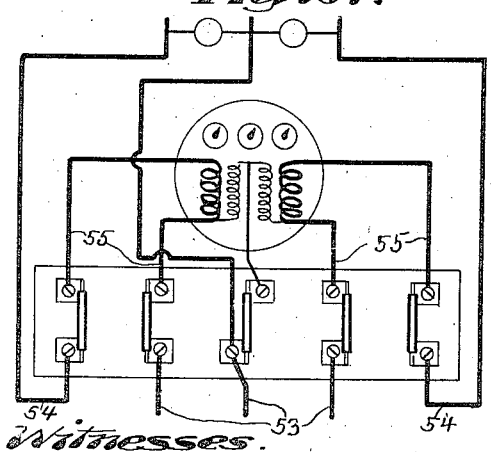

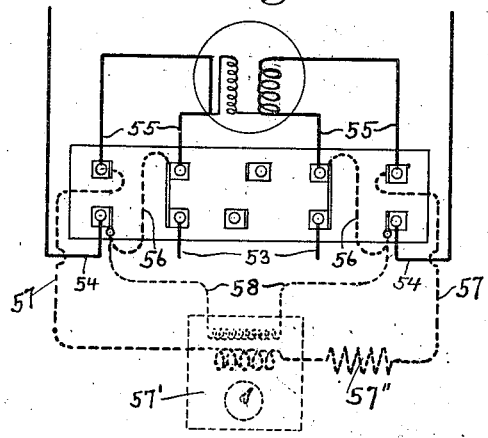
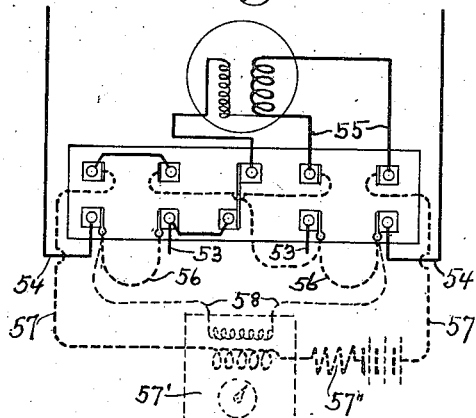
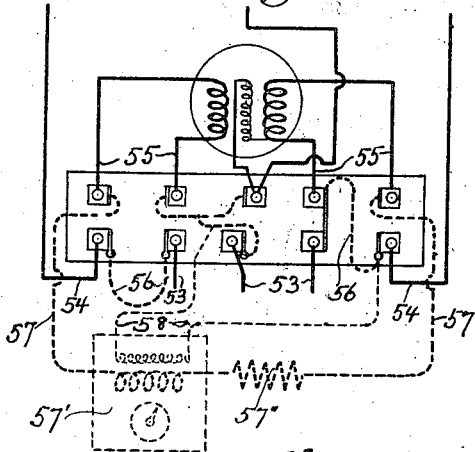
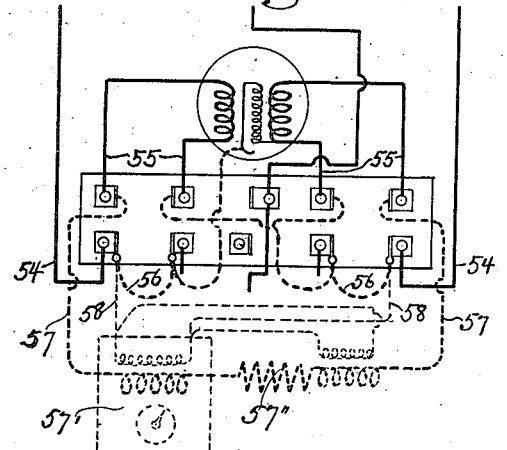
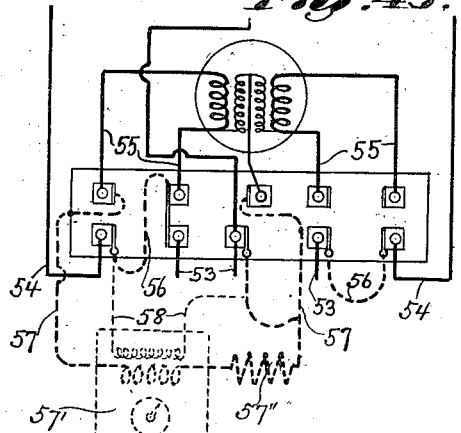
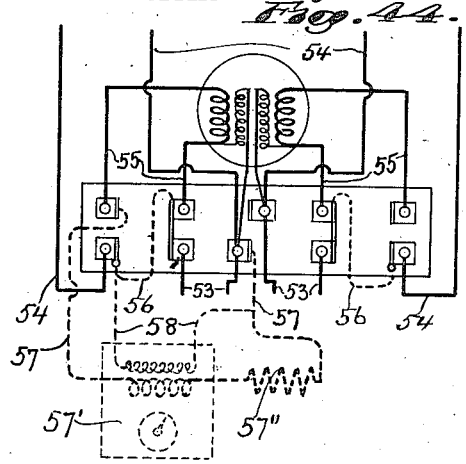

J. SACHS.
SERVICE AND METER TESTING AND CONNECTION BLOCK.
APPLICATION FILED DEC. 14, 1914.
1,170,112.
Patented Feb. 1, 1916.
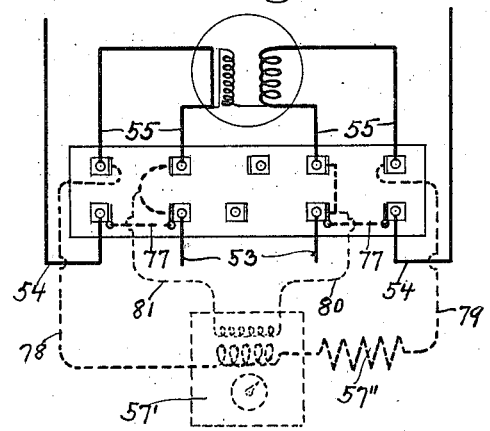
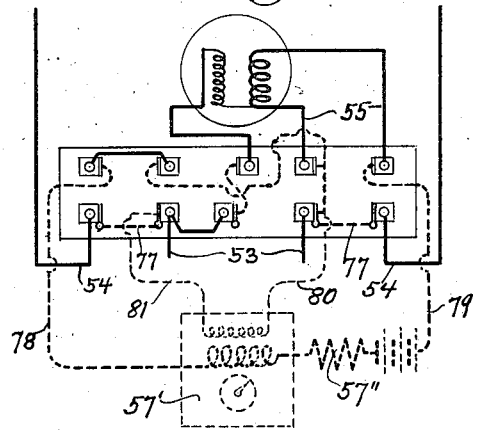
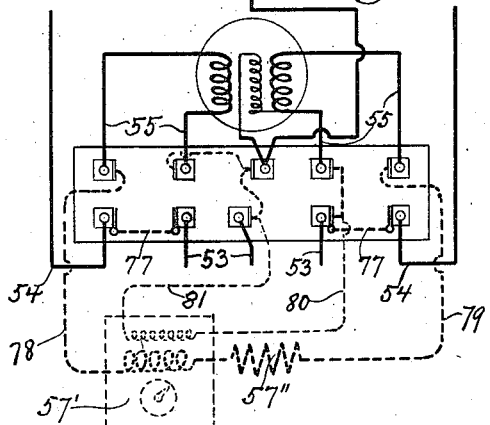
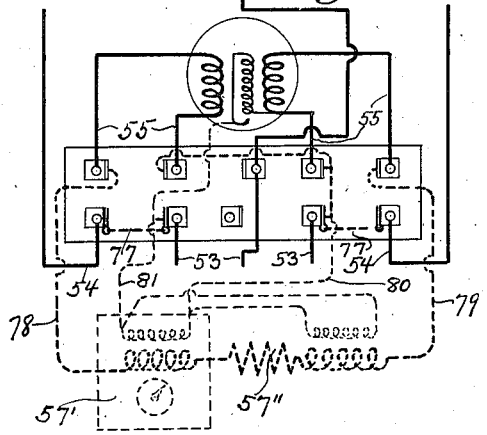
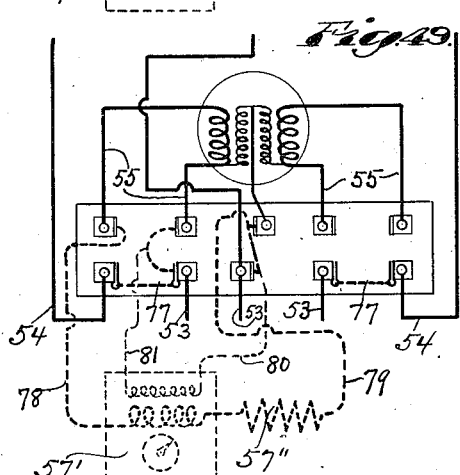
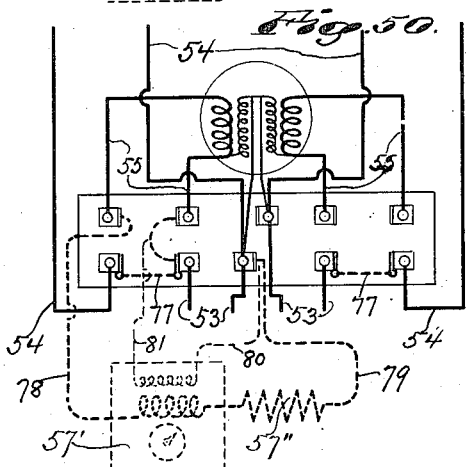

UNITED STATES PATENT OFFICE.

JOSEPH SACHS, OF HARTFORD, CONNECTICUT.

SERVICE AND METER TESTING AND CONNECTION BLOCK.

1,170,112. Specification of Letters Patent. Patented Feb. 1, 1916.

Application filed December 14, 1914. Serial No. 877,113.

*To all whom it may concern:*

Be it known that I, JOSEPH SACHS, a citizen of the United States, residing at Hartford, in the county of Hartford and State of Connecticut, have invented certain new and useful Improvements in Service and Meter Testing and Connection Blocks, of which the following is a specification.

My invention relates to what for convenience may be termed a "service and meter testing and connection block".

In my invention I have produced a service and meter testing block providing all features of such blocks heretofore used; viz., the connection of the customer's wires with the service and the meter and also making provision for the rapid and simple connection of the testing devices with these wires and devices, but by my design, arrangement and construction I am able to accomplish these results in a more effective, simple, inexpensive and better manner than heretofore, and in addition have been able to combine in the one set of contacts both the protective features and the meter testing features in such a manner that by means of one block with certain standard contacts thereon I am able to provide either a meter testing block entirely free from protective device, a meter testing block provided with any desired arrangement of protective device in any of the wires or poles, and also am enabled with this one single block to adapt it for use with any of the standard electric service arrangements, that is either two-wire, three-wire, direct or alternating, three-wire polyphase or four-wire polyphase.

In the description and illustration of my invention I have shown a variety of meters, illustrative of certain types and also a variety of testing appliances and connections used with my peculiar and novel devices.

Referring to said drawings: Figure 1 is a plan view of my service and meter testing block free of all connections and without any of the connecting parts or protective devices mounted thereon. Fig. 2 is a front elevation, and Fig. 3 is an end elevation of said block. Fig. 4 is a plan view of the block of Figs. 1, 2 and 3 but with certain of the fused and unfused connectors mounted thereon. Fig. 5 is an end elevation of Fig. 4 showing one of the plain connectors and a fuse-carrying connector. Fig. 6 is a side elevation of one of the plain connectors. Fig. 7 is an end elevation of said plain connector. Fig. 8 is a sectional view of one of the fuse-carrying connectors adapted to receive the ordinary type of screw-plug fuse. Fig. 9 is a top view of said fuse-carrying connector. Fig. 10 is an elevation of the lower portion of said fuse-carrying connector showing also in end elevation the connecting clips forming the terminals of said connector. Fig. 11 is a plan view of the block shown in Fig. 4 with plain and fuse-carrying connectors associated therewith and also with various testing plugs and by-pass bridges in place and arranged for the test shown diagrammatically in Fig. 39. Fig. 12 is an end elevation of the block arranged as in Fig. 11. Fig. 13 is a so-called main or load-testing plug with its connected flexible cable and terminal piece. Fig. 14 is a load testing plug similar to Fig. 13 but in which the flexible cable extending therefrom to the connecting terminal, is provided with a coupling-socket. Figs. 15 and 16 are flexible by-pass bridges complete with their two plugging pin and coupling sockets, the views being at right angles to each other and one of the plug and coupling socket pieces being in section. Fig. 17 shows a cross over loop complete with its two connecting plugs, flexible cable and coupling socket. Fig. 18 is a joining flexible coupling wire or cable complete with its two end plugs and the coupling-socket mounted in the flexible wire connecting the two end parts. Figs. 19 and 20 are two similar so-called volt or potential cords complete with the coupling-plugs at one end of each of the flexible cables and the forked instrument connecting terminals at the other end. These are represented in duplicate to show a complete equipment. Fig. 21 is a potential coil connecting cord with its plug-piece at one end and flexible bared wire at the other end of its cord. Fig. 22 is the block in plan with the parts as shown in Fig. 4 but arranged and positioned to receive another form of testing devices. Fig. 23 is an end elevation of the block completely arranged as shown in Fig. 22. Fig. 24 is an elevation partly in section of what may be called the permanently connected main or load plug, the section showing details of the connecting-clip and connector-receiving cavity. Fig. 25 shows what may be called the interchangeably connected load plug and the connecting-plug and coupling-socket at the end of one of the load testing wires inserted therein and connected to the clip. Fig. 25ᵃ is an elevation partly in section of what may be called the "neutral connecting-plug", this plug being similar to the load plug of 25. Fig. 26 is a section through the clip of Fig. 25 to show its general form and construction of the plug in said Fig. 25 and also to show this clip somewhat more in detail, this illustration of the form of the clip also applying to similar clips of Figs. 24, 28, 29 and 30. Fig. 27 is a small broken away end of Figs. 24, 25 and 28 to illustrate the connector-receiving recess in these plugs. Fig. 28 is a rigid by-pass bridge, in elevation. Fig. 29 is a detail in elevation, partly in section of what may be called the permanent potential testing plug and current feed arranged with its two connected clips, the potential testing cable being permanently connected to one of these. Fig. 30 is a practically similar view of what may be called the interchangeable potential plug with its two separate clips which may, however, be connected together if necessary by the flexible loop and its plug; the view also shows the coupling-socket in this loop. The loop and socket are, however, not always connected across the clips as shown. Fig. 31 is an end elevation of plug 30 showing the connector-receiving clip. Fig. 32 is a detail view of a similar meter connecting flexible cord complete with its plug and flexible bared wire at opposite ends as shown in Fig. 21. Figs. 33 to 50 both inclusive are diagrams hereinafter more particularly described.

Like characters refer to like parts throughout the several views.

Before setting forth in detail the various organizations shown in the drawings, I deem it desirable to describe somewhat more fully than I have the various diagrams.

Figs. 33, 34, 35, 36, 37 and 38 are diagrammatic arrangements of my service and meter testing block connected up with a meter, the service wires and the customer's load. For the sake of simplicity in illustration the connector pieces are all shown plain. The heavy lines indicate the main current carrying wires, while the light lines illustrate potential wires. These figures show different types of meters and services, viz: Fig. 33, two-wire service with two-wire meter, both wires passing through meter; Fig. 34, two-wire service, two-wire meter, one wire passing through meter and one end of the potential coil tapped to other side of circuit outside of meter; Fig. 35, three-wire service, three-wire meter, one end of potential coil tapped outside of meter; Fig. 36, three-wire service, three-wire meter with potential coil connected with two outside wires inside of meter; Fig. 37, three-wire polyphase service with three-wire polyphase meter; Fig. 38, four-wire, two phase service with four-wire two-phase meter, each phase having separate current and potential coil.

Figs. 39, 40, 41, 42, 43 and 44 are diagrammatic arrangements of my service and meter testing block connected to the service and customer's wires as well as the meter and also showing the connections that would exist when the block is arranged with its testing devices for making different types of test on each of the different meters shown. The type of testing appliances or plugs or system which is used in the diagrammatic arrangement of testing circuits shown is that which may be called the flexible bridge system as illustrated in the drawings Figs. 11 to 21 inclusive. In the diagrams shown in Figs. 39 to 44 inclusive continuous lines show the permanent or installation wires and connections and devices, while the dotted lines show the testing wires, connections, parts and devices. The normal arrangements of each of the connections shown in Figs. 39 to 44 are as follows: Fig. 39 corresponds to the normal arrangement shown in Fig. 33; Fig. 40 corresponds to the normal arrangement shown in Fig. 34. Fig. 41 corresponds to the normal arrangement shown in Fig. 35; Fig. 42 corresponds to the normal arrangement shown in Fig. 36; Fig. 43 corresponds to the normal arrangement shown in Fig. 37; and Fig. 44 corresponds to the normal arrangement shown in Fig. 38. In further explanation of the diagrammatic testing arrangements of Figs. 39 to 44, it may be said that Fig. 39 shows a test with a standard meter and resistance, current being taken from the line. Fig. 40 shows test with standard meter and resistance, a battery being used to supply the testing current while current is only taken from the line to supply the potential coil of the installed and testing meter. Fig. 41 shows test with current taken from the line using standard meter and resistance but in which the test is being made at half potential, that is between the central or neutral wire and one of the outside of the three-wire system. Fig. 42 shows a test with standard meter and resistance, current being furnished by a transformer, the primary of which is connected to the line and the secondary feeding current for test, the potential coil current, however, being taken from the line for the potential coils of the installed and testing meter. Fig. 43 shows test with current taken from one phase of a three-phase line using standard meter and resistance, only one side of the installed meter being tested at a time. Fig. 44 shows test made on one phase of the two-phase service using standard meter and resistance, only one side of the two-phase installed meter being tested at a time.

Figs. 45, 46, 47, 48, 49 and 50 are diagrammatic arrangements of my service and meter testing block connected to the service and customer's wires as well as the meter and as in the case of Figs. 39 to 44 inclusive, showing the connections that would exist when the block was arranged with its testing devices for making different types of tests on each of the different meters shown. While the type of testing appliances or plugs or system which is used in the arrangements of Figs. 39 to 44 inclusive is of what might be called the individual plug and flexible bridge type, that used in the diagrammatic arrangements of Figs. 45 to 50 inclusive is of what might be called the composite plug and rigid bridge type such as are illustrated in the drawings of Figs. 22 to 32 inclusive. As heretofore the continuous lines show the normal or installation connections, wires and devices, while the dotted lines show the testing wires and devices. The normal arrangement of each of the arrangements shown in Figs. 45 to 50 inclusive are as follows: Fig. 45 corresponds to the arrangement of Fig. 33; Fig. 46 corresponds to Fig. 34; Fig. 47 to Fig. 35; Fig. 48 to Fig. 36; Fig. 49 to Fig. 37 and Fig. 50 to Fig. 38. The arrangement of the tests and styles of meters are as heretofore, that is Fig. 45 shows a test with a standard meter and resistance, current being taken from the line; Fig. 46 shows a test with standard meter and resistance but a battery being used to supply testing current, while current is taken from the line to supply the potential coil of the installed and testing meter. Fig. 47 shows test with current taken from the line using standard meter and resistance but in which the test is made at half the potential, that is between the central or neutral and one of the outside of the three wires of the three-wire system. Fig. 48 is a test with standard meter and resistance, current being furnished by a transformer, the primary of which is connected to the line and the secondary feeding current for test, the potential coil current being taken from the line itself for the potential coils of the installed and testing meters. Fig. 49 is a test with current taken from one phase of a three-phase line using standard meter and resistance, only one side of the installed meter being tested at a time. Fig. 50 is a test made on one-phase of the two-phase service using standard meter and resistance, only one-phase of the two-phase line installed meter being tested at a time.

Referring now in detail to Figs. 1 to 10 inclusive, 2 is a base of insulating material such for instance as porcelain or any other well-known material adapted to this purpose; and which may be provided as shown with the partition walls 3 projecting outwardly from the base the necessary extent to act as guards between the conducting parts of each pole mounted on the base. On the outer side of the base are the recesses or depressions 4 and holes 5, one hole leading from or intersecting each recess or depression. It will be noted that there are ten such holes and ten depressions. At the inner or bottom side of the base the holes 5 open into the chambers 6 which as shown are square. Holes 7 are utilized to receive means for holding down the base to a wall or other foundation on which said base may be mounted. Mounted in each of the recesses or depressions 4 is a contact shown as an L-shaped connection and contact member 8 generally formed up from flat stock such as brass or copper, and these contact and connection members at their bent base or seat have slight grooves 9 and holes, the latter being intended to receive the threaded eyelets or grommets 10, having squared heads to fit the appropriate square chambers 6 in the inner or lower side of the base 2. The upper ends of these threaded eyelets or grommets enter the holes 5 in the bases of the members 8 and are riveted over, so that the members 8 are firmly held by the grommets 10 to said base. Received in the internal threads of the grommets 10 are the screws 11 which clamp down the washers or clamp pieces 12 having grooves 13 complemental to the respective grooves 9 of the members 8, the service, meter and customer's load wires being connected to the block by their insertion in the pairs of mating grooves and firmly connected and held in place by setting the screws 11. It will be noted that the contact and connection members 8 are arranged in pairs, there being in the construction shown, five of such pairs, the upwardly extending contact portions of each pair of the members 8 being in alinement transversely of the block. In the construction and arrangement shown the two pairs on the right end of the base form the contact members for one pole. The two pairs on the left end of the base form the contact and connection members for a second pole, while the single pair of contact and connection members in the center of the block and between the walls 3 form the contact and connection members for a third pole. It will, therefore, be seen that the block with its contact and connection members is adapted for three-pole or three-wire use if connection is made across each pair of contact members, but it will be understood that if the central pair of connection members is not bridged or connected across, then each one of the central pair of contact and connection members may be used as a terminal piece for a separate or distinct pole such as would for instance be the case if the block were used as hereinafter shown for a two-phase, four-wire arrangement.

It will be noted that the upwardly projecting portion of the members 8 on one side of the base each have a hole or aperture 14, the purpose of which is to receive a projection on a connector member whereby said connector member is adapted to pivotally swing on the supporting portions of the members 8.

For the purpose of connecting across each pair of contacting and connecting members 8 I use a connector member. These connector members may be of different forms, construction and design, for example they may be either solid conductors without any provision for carrying protective devices, or they may be of such construction as may be adapted to receive and hold or carry protective devices such for instance as fuses, or if the fuse be of the inclosed type, this complete with its casing may be adapted to serve as a connector. Figs. 6 and 7 show a solid or unfused connector made of strap or flat metal such for instance as spring bronze or brass and provided with the complemental flat sides 15 the inside surfaces acting as contacts, joined by the split tubular or cylindrical like hollow head portion 16, the whole presenting when looked at from one end a spring fork or split tube clip member. At one end on the inner surface of one side of the flat portions 15 is the internally projected nib, stud or pivot 17. The connector as shown in Figs. 6 and 7 is adapted to be clipped onto a pair of contacting members 8 and due to the spring in the cylindrical portion the sides 15 of the connector will firmly grip and contact with the outwardly projecting contacting portions of the members 8 so that a good contact is secured. The nibs 17 are adapted, however, when the connector members are pushed into place on the members 8, to be received in the apertures or holes 14 and thus when so received being adapted to swing on the pivots or hinges so formed. This swinging of the connector members provides a way of opening and closing the connection through the medium of the connector members between each pair of contact members 8.

Figs. 8, 9 and 10 show in detail a connector member adapted to receive, carry and hold a protective device, in this particular case the protective device being a so-called "screw-plug-fuse" of the well-known type. 18 is a cylindrical like shell of insulating material such as porcelain, having the circular depression or recess 19 extending longitudinally from the top inwardly. 20 is a radial, inwardly-extending aperture of the general outline shown and 21 is a similar radial, inwardly-extending aperture of somewhat greater depth. These two apertures are at what might be called the base of the shell 18 and are in alinement and located so as to be diametrically opposite at the base. Inserted in the cavity 19 and bottoming therein is the threaded contact shell 22. Inserted in the cavity 20 is the clip piece 23 shaped in outline when looked at from the end, like the solid connector of Figs. 6 and 7. Inserted in the aperture 21 is a similar clip like piece 24 provided, however, at its inner end with a projecting portion threaded to receive the screw 25. The upper part of the clip 23 is also threaded to receive the screw 26. The threaded connecting shell of metal has a base portion bottoming in the recess or cavity 19 and is clamped down by the ring 27 by means of the screw 26 which holds together the shell 22 and the clip 23. On top of the ring 27 are the mica washers 28 and the screw 25 passes through these washers, being insulated thereby from the shell 22 and screws into the threaded portion at the inner end of the clip 24. In this way the head of the screw 25 serves as one terminal of the screw-plug receptacle while the shell 22 serves as the other. It is unnecessary to describe the fused plug 29 which is inserted in the shell and connects therewith and the head of the screw 25, because this is of the well-known standard type and in the form shown the top has a mica window through which the fusible conductor inside the plug can be seen.

Referring now again to Figs. 4 and 5 it will be noted that the base block is shown provided with both solid or unfused connectors, and fuse-carrying connectors, the outer pair of contacting and connecting members 8 at each end of the block right and left is provided with a solid or unfused connector such as is shown in Figs. 6 and 7. The central pair of contacting and connection members 8 is also provided with a similar solid connector while the two remaining pairs of connection and contacting members 8 immediately adjacent to the end pairs are each provided with a fuse carrying or holding connector such as is shown in Figs. 8, 9 and 10. Consequently it will be noted that from the above description the block is adapted for three-wire use and as will hereinafter be shown for two-wire use, and also when the central connector is omitted for four-wire polyphase. When adapted for three-wire use each of the outside wires of the three-wire circuit will be fused while the neutral wire will be unfused or solid. When adapted or used for two-wire service each of the two wires of the line will be fused while the central members 8 and the connector shown in conjunction therewith will be used for certain connecting purposes with the meter as will also be indicated hereinafter.

Reference to Fig. 4 shows by dotted lines, a solid connector and a fuse carrying connector broken away and swung up at right angles to the normal position in which these connectors are when they connect across the two members 8 forming each pair. The arrangement of the connectors, so that they act to either connect across each pair of the members 8 or are adapted to open the connection between each pair, is for the purpose of putting the members on one side of the block from which the connectors are freed into shape for testing purposes and also to permit of connection through the connectors with the other members. As will hereinafter be shown, however, such opening up of the connection between each pair or any desired pair of the members 8 is, however, usually performed after connection has been made across a pair of adjacent or otherwise disposed connectors of the same polarity, by what I call a bridge piece, the purpose of which is to maintain electrical continuity between the connectors while at the same time when these connectors are opened up, freeing certain of the contacts 8 and making them accessible to receive or contact with the testing plugs. As will be noted the connectors at their upper or hollow head portions have circular openings adapted to receive the contact pins of plug pieces or members forming the terminals of bridging members. It is important here to note that the connector members whether fused or unfused are not only adapted to make and break the connection between each pair of the members 8 with which each connector is associated but are also adapted to receive suitable means such as bridging pieces or by-pass pieces or members, which by-pass or bridging pieces, whether flexible or rigid, after being associated or connected with two of the connector members, then permit the opening up of one or both of the connector members with which the bridging member or piece is connected or associated.

As already noted I have shown in the drawings two systems, forms or methods of testing-plugs and testing-connecting devices, one of which I have termed the flexible bridge, individual plug method, and the other the rigid bridge composite plug method. In Figs. 13 to 21 inclusive I have shown the various plugs, bridges, loops and instruments, cables and associated parts of the flexible bridge individual plug system, and in Figs. 11 and 12 certain of the plugs, bridges, connecting cables and loops, etc., in place on the block with the connectors in a position for carrying out of a certain test hereinafter more fully discussed and diagrammatically illustrated in the drawings. The devices shown in Figs. 13 to 21 inclusive are illustrative of one of the many types of parts and members of the flexible testing system for the performance of not only the tests diagrammatically illustrated and already mentioned, but also a great variety of other tests. It will be understood that all of the devices are not always used for making any particular test, and it will also be understood that the connecting loops, cords and cables as well as the receiving sockets and the plugging and coupling sockets may be varied as to position and arrangement in their particular cables and parts.

In Figs. 13 and 14 the two main or what might be called testing load cables complete with their plugs, terminals and the coupling socket in one of the connecting cables are shown. Each of these testing cables and plugs has a suitable length of flexible stranded insulated conductor 30 connected to one end of which is the plug in clip having the insulating cylindrical handle part 31 which at its lower end is apertured longitudinally to receive the connecting clip 32, the end of the wire of the flexible cable or cord being suitably connected to the clip and the clip being held in position in the handle as indicated in the drawing or in any other suitable manner. The manner in which this clip contacts with and coacts with the member 8 mounted on the base is indicated in Fig. 13, the member 8 being indicated by the dotted lines. At the other end of each of these load or main testing cables is a terminal 33 to which the wire of the cable or cord is connected, the joint being surrounded by an insulating sleeve. The flexible wire in one of the testing cables, Fig. 13, extends uninterrupted from the clip to the terminal piece, while the other of these testing cables Fig. 14, has connected to its flexible wire, at any suitable position between the terminal at one end and the clip at the other, a coupling-socket consisting of the central apertured metallic sleeve 34 surrounded by the insulating shell or jacket 35. The wire of this particular cable passes through the insulating jacket and is bared inside and connected to the metallic apertured socket. This form of coupling socket is also used in conjunction with the cross over loop of Fig. 17 and the flexible joining coupling, cord or wire, Fig. 18, and is shown with the insulating jacket in section and the central metallic socket with the bared wire connected thereto in connection with Fig. 17.

Figs. 15 and 16 are as already stated the flexible bypass bridges both of which are alike and consist of the flexible insulated wire 36 of proper length to the ends of which, metallic plug and socket pieces 37 are connected. One end of these metallic pieces 37 is provided with the split pin plug end 38 and the socket plug receiving aperture 39. Surrounding the metallic part to leave the plug pin portion 38 project is the insulating jacket 40 having the aperture 41 so that any of the other plug pins required to perform any particular test may be inserted into the socket aperture 39.

The cross over loop (Fig. 17) has the flexible insulated wire 42 connected at each end to a plug in clip held in a cylindrical insulating handle. These are similar in construction to like parts in Figs. 13 and 14 and are indicated in their entirety by 43. Somewhere between the two ends the flexible wire 42 has connected to it a coupling socket 44 which is similar to the socket 34 already described.

The flexible joining or coupling wire or cable (Fig. 18) has the flexible insulated wire 45 to the ends of which are connected metallic plug pin pieces 46, the joint between the plug pin pieces and the ends of the wire being covered by an insulating sleeve also serving as a handle as shown. Somewhere between the ends of the flexible wire is a coupling socket 47 similar to the sockets 34 and 44.

The volt or potential cords or cables (Figs. 19 and 20) have the flexible wire 48 to one end of each of which is connected the plug pin piece 49, the joint with the wire being covered by an insulating sleeve which also serves as a handle, these plug pin pieces 49 being similar to the plug pin pieces 46. At the other end of each of the flexible wires or cables of the volt cords 48 are the forked, testing instrument connecting terminals 50, connected to the respective wires 48, the joints being also covered by insulating sleeves.

The installed meter potential coil connecting cord (Fig. 21) consists of the flexible insulated wire or cable 51, one end of which has the plug pin piece 52, the joint between the wire and the plug pin piece being covered by an insulating sleeve, and the other end of the flexible wire 51 being left bare, so that it can be connected by twisting or otherwise to the freed terminal of the potential coil of the installed meter in making certain tests as diagrammatically indicated in Figs. 42 and 48. The plug pin piece 52 with its insulating sleeve is similar to the plug pins, pieces or parts 49 and 46, the metallic plug-in portion or pin being made of hard brass or similar material and it may be slit longitudinally as shown to provide a resilient pressure so that good contact is made when it is plugged in into the receiving aperture of the coupling socket or elsewhere as may be necessary. It will also be noted that the apertured coupling sockets 34, 44 and 47 and the apertured plug pin receiving portion of the plugs of the combined plug and socket pieces used in connection with the by-pass bridges (Figs. 15 and 16), are similar in arrangement so far as concerns the plug pin receiving aperture in the metallic portion and also in the insulating materials jacketing the metallic portions, so that the plug pins like 46, 49 and 52 are interchangeably receivable into these socket apertures. It is also desirable, although not essential, that the plug-in ends like 38 of the flexible bridges be also made of similar size and style so that the uniformity of dimension may exist between all the plugs and their receiving apertures. As will be noted in the drawing the plug pin pieces at the ends of the flexible bridges are intended to be received into the interior of the cylindrical like hollow head portions of the connector members 15 or their equivalents.

I have shown in the drawings and described above, the various testing plugs, coupling sockets, cables, loops, volt cords, etc., which form a complete set or outfit as it may be called, to make it possible to perform any of the variety of tests with the different types of meters. It will be understood, however, that where certain definite tests on certain types of meter only are to be made, that all of these are not needed. However, in their entirety as shown they provide complete plugging and connecting means and devices for the performance of almost any practical test with any of the standard and ordinarily-used types of meters whether two-wire, three-wire, direct or alternating, single phase or three or four polyphase. In order to illustrate the manner of using some of these testing bridges, plugs, sockets and other parts in the making of an actual test on the block, I have shown in Figs. 11 and 12 a meter testing block equipped with fused and unfused connectors in a manner somewhat similar to that shown in Figs. 4 and 5 but in which the central connector has been omitted to leave the central pair of connector and contact pieces as 8 free. In the particular installation and with the particular style of meter for which this block has been arranged, this central pair of connection and contact members are not required. The block as installed and in normal service is arranged and serves to electrically connect and contact in accordance with the diagrammatic arrangement shown in Fig. 33. That is it is installed in conjunction with a two-wire service using a two-wire meter having both of the wires of the circuit passing through the meter.

The wires of the two wire service are indicated at 53 and these connect to the lower connection and contact member of the second pair from each end of the block.

54 indicates the two wires leading from the block to the customer's load and these are connected to the lower contact member 8 of each of the end pairs. 55 indicate the wires leading to the meter, those on one side being connected to the single current coil of the two wire meter, while those on the other side simply form a loop through the meter to which one terminal of the potential coil of the installed meter is connected. It will be noted that these meter connecting wires are connected to the upper member 8 of each of the pairs in active service on the block. Without going into the particular diagrammatic arrangement of the connections and flow of the current, which will be more elaborately discussed later, it may be said, however, now that the service enters at the wires 53, the meter is connected in by the wires 55 and the wires 54 feed from the block to the load, and in that manner the current passes through the connectors of the block to the meter and to the translating devices.

In the particular testing arrangement of Figs. 11, 12 and 39, one of each of the flexible bridges as shown in Figs. 15 and 16 is usually first plugged into the hollow cylindrical head of two adjacent connectors, one of them as shown being fused, the other unfused. The two connectors may be said to be the incoming and outgoing connectors for that particular pole of the circuit. After the by-pass has been connected the unfused connector is, in this particular test, swung up and away from the complemental contact member 8 of its pair, to the other one of which pair the other end of the connector is still connected. Consequently the bridges as indicated in their entirety by 56 connect across directly from one to the other of the two adjacent connector members and the insulating handle of the combined plug pin and socket end piece has served as a handle for the manipulation of the connector which has been swung upwardly. Onto the connection and contact members 8 which have been thus exposed or freed or made accessible by the swinging away and disconnection of the connector member, is now clipped or plugged or pushed, one of the main or load plugs having its respective flexible wire and terminal ends connected thereto and these are indicated in their entirety and in position on the freed members 8 by 57. It will be understood that the terminal ends of each of these two main load wires or cables extending from the plugs connecting with their respective contact members 8 are extended to and connect with the standard testing meter 57' and resistance 57, etc.

There may now be plugged into socket aperture of one of the combined socket and plug pieces of each of the flexible bridges, for the purpose of receiving current for the volt coil of the standard meter, the plug pin ends of the volt or potential testing cords which are indicated in their entirety by 58 and the other or terminal ends of these volt cords extend to the potential coil of the testing meter.

As arranged in Figs. 11 and 12 and also in Figs. 4 and 5 the second connector from each end is shown as a fuse carrying connector. It will be understood that this second connector may be a plain or solid connector or that the fuse-carrying or fused connector may be the end connector, but it is desirable that the service or incoming wires be connected to the contact members 8 forming one of the pairs with which the fuse connector is coactive so that the service current enters the block first through the fused connector, where such connectors are used. Certainly where the block is used with a complete outfit of solid or unfused connectors, fuses or other protective devices are usually provided elsewhere.

For the purpose of diagrammatically illustrating some of the many normal installation connections of my service and meter testing block, I have in Figs. 33 and 38 inclusive shown various types of meters and services. The circuit arrangements and contacting paths will be clearly perceivable from the diagrams. For the sake of simplicity in diagrammatic illustration I have indicated the connectors of the plain or unfused type, but it will be understood that these are removable and interchangeable.

Corresponding in sequence to the diagram shown in Figs. 33 and 38 inclusive, are the diagrammatic arrangements of Figs. 39 to 44 inclusive, which show as has been already stated each of the normal arrangements of Figs. 33 to 38 disposed and arranged by a proper manipulation of the connectors on the block and the proper bridges, plugs, etc. for the performance of different tests. As has been stated the test diagrams of Figs. 39 to 44 show the arrangement of parts and circuits when the flexible system of appurtenances just described are used. It will be understood, while I have shown only one form of test with each normal installation diagram, that with the test appurtenances and with the block arrangement, any other form or style of test may be performed on any of the particular installation arrangements shown. In other words in Fig. 39 as shown a two-wire service with two-wire meter having both wires pass therethrough is tested with current from the line, using a standard meter and resistance while in Fig. 40 the two-wire service is connected to a two-wire meter, with only one wire passing through the meter, one end of the potential coil of the meter being tapped on the outside to the block, current for the test being provided by a battery and current for the potential coils of the installed and test meters being supplied from the line. The battery test may be made on the normal arrangement of Fig. 39 and vice versa, the test of Fig. 39 may be made on the normal arrangement of Fig. 40 and it is for that reason that the various testing appurtenances and devices are provided. In connection with this point it may be well to refer back to Figs. 11 and 12. Here is shown the arrangement of the block and its testing appurtenances, devices, etc., arranged for the test of Fig. 39 and as will be seen that while the two flexible bridges, the two main load plugs or cables and the two potential cords or cables are used, that the flexible loop of Fig. 17, the flexible connecting coupling cable of Fig. 16 and the potential connecting cord of Fig. 21 are not used, these, however serving as will be noted from the other diagrams (Figs. 40 to 44 inclusive) when other styles and forms of testing arrangements are carried out. In the diagrammatic illustrations (Figs. 39 to 44) showing the testing circuits as well as the service and load connection arrangements I have indicated as clearly as possible, the various parts and members of Figs. 13 to 21 and also the point on each at which they are joined or coupled, although it will be obvious that a great variety of connections and couplings is possible.

In the diagrams Figs. 39 to 44 illustrative of tests with the flexible bridge system of testing appurtenances, the by-passes and other testing appurtenances indicated diagrammatically bear characters corresponding to those identifying the same style of testing appurtenances in Figs. 11 to 21 inclusive. In all the diagrams including Figs. 33 to 50 inclusive the service wires are denoted by 53, the load wires by 54 and the meter connecting wires by 55, these characters agreeing with the characters applied to the same parts appearing in Figs. 11 and 12 and 22 and 23.

It is to be observed that while in some of the tests (those in Figs. 39 to 44 inclusive) only one of the connectors of each adjacent pair of connectors electrically connected in each pole or leg of the outside wires of the circuit, is manipulated to electrically open or make accessible its complemental connection and contact member 8, in other tests both connectors of adjacent pairs connected as above stated are opened up and freed from their complemental contacting members 8. This is accomplished by either opening up one at a time or the insulating handle part of the combined plug pin and coupling socket pieces of the flexible bridges may be grasped and thus both of the connectors moved together. Or if desired both may first be opened up and then the one desired returned to its original position.

In order to illustrate another form of testing appurtenances and devices which may also be used with the service and testing block I have shown in Figs. 24 to 32 inclusive, parts, members and devices including plugs, cables, cords, couplings, sockets, terminals, etc., of what may be called the composite plug rigid bridge system as distinguished from the individual plug flexible bridge system already above described. It will be apparent, however, that there are also other arrangements of testing devices and combinations of both the flexible and rigid system which may be adapted for use with my service and testing block. Generally the several parts of the rigid system perform the same functions as those of the flexible system.

There are two main load or testing cables or flexible insulated wires, one of which terminates at one end in the clip contactor 60, the wire being suitably soldered to the jacketed end of the clip as shown. In Fig. 24 one of these clips complete with its insulating jacket or handle block is shown, and in order to more clearly perceive the general form of the clip contactor which is made of spring metal such as bronze, reference may be had to Fig. 26 in which a section is shown through the material so as to give an end elevation outline of the complete clip contactor. At one corner of the insulating handle block is the slot or recess 61 the general form of which is shown by the end view in Fig. 27.

The other load wire or main testing cable terminates at one end in the combined plug pin and socket member 62 having the projecting plugging end pin and the plug receiving aperture and constructed in a general way similar to the members used in conjunction with the flexible bridges of Figs. 15 and 16. The plugging end pin of this combined member forming the terminal of one of the main testing cables may be inserted into the upper rounded end of the clip contactor 63 which is in general conformation similar to the contactor 60 being also jacketed and held in its handle block, but instead of having the end of the main testing cable soldered thereto or permanently connected thereto, this particular clip contactor with its handle block is adapted to be easily and readily disconnected from the terminal of its main testing cable. The form of this clip contactor endwise is also like that shown in Fig. 26, and one end of the insulating block handle is also provided with the groove, recess or aperture having a conformation similar to that shown in Fig. 27.

Another clip contactor complete with its insulating block handle Fig. 25ᴬ, and having the groove or aperture already referred to in one corner of the insulating block handle is also provided and this clip contactor complete with its block handle is in every way similar to the clip contactor and handle of Fig. 25, it also being adapted to receive the plugging pin end of either a combined socket and plug pin piece terminal or any other form of plug pin piece without the socket. This clip contactor is provided for connection with the central connection and contact members 8 when it is necessary to so connect with the neutral or middle wire of the three-wire circuit and is only used for certain tests usually when the central pair of the members 8 are used independently.

The clip contactor of Fig. 29 is what may be called the permanent double or potential and current feed contactor. In this contactor two clips are provided, one 64 being like the clip 63, and the other 65 being shorter but of the same general conformation, an end view of this clip 65 being shown in Fig. 31. While the clips like 60, 63, 64 and 67 contact with the freed members 8 and may be called the base contact testing clips, the clips like 65 and 68 contact with the flat sides of the exposed ends of the connector members like 15 of Fig. 6 or 24 of Fig 8 and may, therefore, be called the connector, feed or line testing clips. Electrically connecting the two clips 64 and 65, is the bar or rod 66 and both contactors or clips are surrounded and jacketed by the insulating handle block in a similar manner to those already described. Permanently connected to the upper end of the clip 65 is one end of one of the volt or flexible volt or potential wires or cords, while the upper end of the clip 64 is provided with the hollow rounded aperture similar to that of clip 63. Another contactor in some way similar to the contactor of Fig. 29 is shown in Fig. 30, but this contactor while also provided with two contact clips, one 67 being like 60 of Fig. 24 and the other 68 being like 65 of Fig. 29. These two clips are not permanently connected together as in the case of the contactors of Fig. 29 but may either be so connected or may be electrically free and separate, and for this purpose may be provided the flexible loop or joining wire 69 provided at one end with the plug 70, one end of the wire being connected to the plug pin and provided with a suitable insulated jacket handle while the other end is permanently soldered to the upper end of the clip 67. Somewhere between the two ends of the wire 69 is the coupling socket 71 which is similar in construction to the coupling sockets 34, 44 and 47. Surrounding the clips 67 and 68 is the insulating handle block which holds them firmly together in a manner similar to that indicated with the other clip contactors just as described. It will be understood that while the flexible loop is shown connecting across from the clip 67 to the part 68 so that electrically these two clips are the same as in the case of the contactor clips of Fig. 29, yet this only shows one arrangement of the contactor clips of Fig. 30 because in other cases and where other tests are to be made, it will be necessary to remove the plug 70 from the clip 68 and insert it into the other clips, such for instance, as the clip 64 of the contact of Fig. 29.

The installed meter potential coil connector flexible with its plug pin piece of Fig. 32 is similar to the same part shown in Fig. 21 and need not, therefore, be described.

The rigid bridge shown in Fig. 28 consists of the two conducting plug pins 72, electrically connected together by the plate or connecting bar 73, the conducting parts being held in the insulating handle 74. The two pins are so spaced as to correspond to the spacing of the adjacent pairs of connectors, into the hollow heads of which they are to be inserted. An end elevation of the insulating handle is shown in Fig. 23 in which the bridge is connected to and associated with the two connectors on one pole.

As in the case of Figs. 11 and 12, I have shown in Figs. 22 and 23 the block complete with its mounted connection and contacting members, and its fused and unfused connectors, but instead of being arranged for use with the flexible system as in the case of Figs. 11 and 12, it is here shown arranged with the rigid testing appurtenances which are shown mounted on the block in position for a test with the bridges and connectors drawn back. It will be noted by reference to these figures that the contactor blocks or pieces or members have been shown connected to their cables or wires, but instead of each of the wires or cables from each of the contactors being separated and distinct from the other, they are bunched or cabled together into a composite cable. The two main or load testing wires from the two main contactor members or blocks terminate in the terminal pieces 75 which are similar in construction to the terminal pieces 33 of Figs. 13 and 14, while the two potential or volt wires or cables extending from the two volt or potential contactor blocks or members terminate in the two potential or voltage instrument terminals 76 which are similar to the terminals 50 of Figs. 19 and 20.

In making tests with the rigid bridge devices, the two pins 72 of a rigid by-pass bridge are first inserted in the hollow cylindrical heads of two adjacent connector members 15. As shown in the drawing one of these is fused and the other unfused, and these are as stated, adapted to be swung out of contact with one of each pair of the connection and contact members 8 with which each of the connectors is associated. I have designated, in Figs. 22 and 23 and also in the diagrams, Figs 45 to 50 inclusive, the bridges in position on the connectors by 77 and the two outer pairs of connectors, one of which is fused and the other unfused, are shown swung upwardly out of connection with the complemental connection and contact members of each connector. The bridge piece which has served to connect across from one connector to the other, by-passes the current around the meter, while at the same time the insulating handle of each of the bridges has served as a handle to move the two adjacent connectors together or as a unit into testing position. The permanent load or main testing conductor with its handle block as shown in Fig. 24 has been designated in Figs. 22 and 23 and also in the diagrams, Figs. 45 to 50 inclusive, as 78 while the interchangeable load or main testing contactor with its handle block and also the terminal plug and socket terminal of the cable or wire connected therewith has been designated as 79. The permanent potential and current feeding plug shown in detail in Fig. 29 has been designated as 80 while the other potential contactor with its connecting loop as shown in Fig. 30 has been designated as 81. While one of the terminals of the potential or volt wires or cables, is permanently connected to the contactor 29, the other volt or potential wire terminates in a plug pin with insulating sleeve 82 which is similar to the plug 61 excepting that it is not provided with a receiving aperture but merely with a plugging pin, and this plug is received in the socket 71 and in that manner this volt or potential wire is connected with the two clips 67 and 68 of the contactor block of Fig. 30. It will be understood, however, both the wire terminating in the plug 82 and that terminating in the plug 79 may be connected to or inserted in other receiving sockets or directly in the cylindrical hollow heads of the contactor clips or the connectors.

The general arrangement of the complete block conditioned for testing with its testing devices of Figs. 22 and 23 is similar to that of Figs. 11 and 12. It is arranged for two-wire service and as shown conditioned with its testing devices to perform the test of Fig. 45 which test is of the same nature as that shown in Fig. 39.

The testing appurtenances of the rigid bridge system indicated diagrammatically in Figs. 45 to 50 inclusive bear characters corresponding to similar parts as shown in Figs. 22 and 23.

In order to diagrammatically illustrate the circuit arrangement and current paths when tests with the rigid bridge composite plug or contactor system are made, I have shown in Figs. 45 to 50 diagrammatic connections and arrangements showing as in the case of Figs. 39 to 44 certain tests on each of the normal installation arrangements shown in Figs. 33 to 38 and each of these tests of Figs. 45 to 50 corresponds to each of the tests in sequence of Figs. 39 to 44 respectively, the difference being merely in the devices and appurtenances used. In showing these diagrammatic representations of the circuit and connections I have endeavored to have the diagrammatic showing illustrate as nearly as possible the actual placement of the various parts and devices described and shown in Figs. 24 to 32.

In the normal installation condition the block as has already been stated has its connectors contacting with each respective complemental pair of connection and contacting members 8 and when a test is to be made the first operation is to insert in the desired connectors to be moved or manipulated, the bridge piece whether flexible or rigid, and then after the bridge piece has been properly and firmly inserted into its receiving sockets in the head of the connectors the current has been by-passed around the meter and these connector members may be then moved upwardly out of connection with such of the members 8 as may be desired for testing purposes. After this has been done, connection is then made with the desired members 8 and such parts on the bridges or the opened connectors as may be needed for electrical connection by means of the appurtenances and devices of Figs. 13 to 21 or those of Figs. 24 to 32. It will be understood that in using the flexible system, connection across from the current feed or service side, across to the meter side of the block, is made by means of the flexible connecting cords and cables with their associated plugs and receiving sockets while in the case of the rigid composite plug system connection across from the service side of the block with its swung up connectors, is made by means of the composite contactor clips such as that shown in Figs. 29 and 30. The shorter or what might be called connector receiving clips like 65 and 68 of Figs. 29 and 30 respectively are adapted to be clipped over and contact with the exposed sides at the ends of the solid connectors like Fig. 6 when swung up out of engagement with its complemental member 8 or the members 24 of Fig. 8 of the fuse carrying connectors when in a similar position. In order that the clip like sides of the plain connectors and clips of the fused connectors may also be firmly clipped together and also to aid in mounting and placing of the contactor elements, it is intended that the grooves as shown in Fig. 27 although containing no conducting parts also firmly grip the ends of the associated connectors.

While I have only shown in connection with each set or system of testing devices a block arranged with each of the particular kind of devices for the performance of only one test, it will be readily seen from the diagrams and from the various testing devices how and what the arrangement would be for any of the other tests of the diagrams as well as for such other tests as may be desired.

In the showing which I have made and the accompanying description only one form of service and testing block embodying my invention has been shown. In this form one kind of solid connectors have been used and one form of fuse carrying or fused connectors. It will be understood that I in no way intend to limit myself to the particular construction of the base, contacts, or the connectors joining complemental members of each pair of contacts. There may be a variety of forms of these elements. I also do not wish in any way to limit myself to the particular means of by-passing or the means for opening the circuit from one to the other of each pair of complemental contacts. I have shown the connectors as being movable on a pivot, but as will be appreciated I may use any other motion or movement.

While an arrangement of connection and contact members, such as is shown in the particular block here illustrated possesses advantages and is of particular utility in connection with certain meter connection and testing installations, the invention is not restricted to the particular number of pairs of connection and contact members with their co-active connectors. I also desire to call attention to the fact that any one or more of the connectors may be of fuse-carrying character and that the fuse-carrying connector may be either on the service or load side of the meter coil. Furthermore, the connectors serving for other purposes than that just mentioned may also be fused or unfused as desired. If desired, the connector on the load side as well as the connector on the service side may be a fuse-carrying connector. It is to be observed that in the connector there is provided an element which in itself, serves the dual function when desired of both a cut-out and a testing device and that this connector whether fused or unfused, acts as a circuit opening and closing member electrically placeable on one or both sides of a meter coil, whereby current may be by-passed around the meter coil and the terminal or terminals of said coils may be electrically freed by the movement of the connector and the electrical connection therewith of testing instrumentalities.

What I claim is:

1. A base, a pair of contacts on said base, and means for electrically connecting the contacts or breaking the electrical connection therebetween, said connecting means being provided with means for the electrical connection therewith of testing means, the connecting means when the testing means is connected therewith being movable to electrically free for testing purposes at least one of said contacts.

2. A base, a pair of contacts on said base, and a connector coöperative with said contacts to make and break connection therebetween, said connector being provided with means for the electrical connection therewith of testing means irrespective of the position of said connector.

3. A base, a pair of contacts thereon, a connector to make and break the electrical connection between said contacts, one of said contacts being electrically freed for testing purposes when the connector has been moved to the breaking position, and means for making electrical connection with that part of the freed contact which is engaged by said connector when in the circuit making position thereof, the connector having means for the connection therewith of testing means in any of the positions thereof.

4. A base, a pair of contacts thereon, and a connector directly coöperative with said contacts and movable to open and close the connection between the contacts and when in the open position freeing one of said contacts for testing purposes, said connector being provided with means for the connection thereto of testing means irrespective of the position of said connector.

5. A base, at least four contacts arranged in two pairs thereon, means for electrically connecting or disconnecting the contacts of each pair independently, means for electrically bridging across from one of the contacts of one pair to one of the contacts of the other pair, and for maintaining said bridging connection when the other contact of each pair has been freed by opening the connecting means between each pair, the connecting and disconnecting means of at least one pair of contacts being included in the bridging circuit.

6. The combination with at least two connector members and their associated pairs of contacts, of an electrical by-pass bridge for connection with a connector, said by-pass bridge being provided with means to serve as a manipulating part for at least one of the connectors.

7. Means for connecting or disconnecting a pair of contacts, and means for electrical connection with the aforesaid connecting or disconnecting means, said last means when so connected serving as a manipulating means for the connecting and disconnecting means to render one of the contacts of the pair accessible for testing.

8. A pair of contacts, a connector movable to electrically make or break connection between said contacts, said connector being provided with means for the connection therewith at will of means whereby said connector can be manipulated to free one of the contacts of said pair.

9. A circuit closing and opening device including contacts and a connector for closing and opening the connection between the contacts, in combination with independent means adapted for electrical connection with said circuit opening and closing device, said circuit opening and closing device being manipulable to open or close the circuit when said means is connected therewith for testing purposes.

10. A base, at least two pairs of contacts mounted thereon, a connector independently electrically joining each pair of contacts, a bridge adapted for electrically connecting the connectors and when so connected to provide for their manipulation to open or close the connection between the contacts of each pair.

11. A base, a pair of contacts mounted thereon, a connector electrically joining the contacts, a bridge adapted for electrical connection with the connector and when so connected to provide means for the manipulation of the connector to open or close the connection between the contacts with which it is associated.

12. A base, at least two pairs of contacts mounted thereon, an independently operative connector associated with each pair of contacts, bridging means adapted to electrically connect across from one connector to the other, at least one of the connectors when so electrically joined by the bridging means being manipulable to open or close the connection between the contacts of its pair, one of the connectors being in the bridging circuit when the bridging means is operatively positioned.

13. A base, at least two pairs of contacts mounted thereon, independently operative rigid, swinging connectors coacting with the pairs of contacts and each movable to electrically free one of the two contacts with which it is associated and electrically joins, and means for electrically bridging directly from one connector directly to the other.

14. A base, a plurality of pairs of contacts mounted thereon, connectors joining the contacts of the pairs, each connector being adapted for movement to electrically free one of the contacts of its pair, and manipulating means attachable to or detachable from said connectors, said manipulating means when attached also serving to electrically bridge from one connector to another.

15. A base, at least two pairs of contacts mounted thereon, a connector pivoted at one end to one contact of each pair, and an electrical by-pass and manipulating bridge adapted for connection with said connector.

16. In combination with a connector and its contacts, an electrical by-pass and manipulating bridge adapted for removable connection with the connector, the connector when said bridge is connected therewith being manipulable to electrically free one of the two contacts with which it is associated and make it accessible for testing purposes.

17. An electrical by-pass and connector manipulating bridge having a conducting portion to provide a current path from a connector to which it may be connected and also having means to adapt it to serve as a manipulating handle for the purpose of moving said connector.

18. A base, at least two pairs of contacts mounted thereon, a separate connector electrically joining the contacts of each pair and an electrical by-pass and manipulating bridge for direct association with said connectors.

19. A movable connector adapted to open or close the circuit between a pair of contacts, in combination with means for electrical and mechanical connection at will with said connector and serving both as a current path and manipulating means for testing purposes.

20. Pairs of contacts, connectors electrically joining the contacts of each pair, a service wire connected to a contact of one pair and a load wire connected to a contact of another pair, a meter coil connected with contacts of each of the aforesaid pairs, and means adapted for removable association with said connectors and serving to by-pass the current around the meter coil and also when so associated serving as a manipulating means to move a connector and electrically free a contact and make it accessible for testing purposes.

21. Pairs of contacts, a service wire connected to one contact of one pair, a consumer's load wire, connected to a contact of another pair, a meter coil connected to the complemental contacts of the two pairs of contacts, a connector joining a pair of contacts, and an electrical by-pass and manipulating bridge adapted when associated with the parts aforesaid including the connector, to by-pass the current around the meter coil and also serving as a manipulating means whereby a connector with which it is associated may be moved to make accessible the terminals of the coil and wires for testing purposes.

22. In a meter testing block, a base, at least two pairs of contacts mounted thereon, a connector associated with a pair of contacts, a meter coil terminal connected to one contact of the pair, means associated with said connector and its pair of contacts to by-pass the current around the meter coil, and to manipulate the connector for electrically freeing for testing purposes the contact to which the meter coil terminal is connected.

23. A base, pairs of contacts mounted thereon, connectors interchangeably associable with any pair of contacts, said connectors being adapted to be moved to remain in connection with one of the contacts of each of their respective pairs and to be disconnected from and make electrically free and accessible for testing purposes the other contact, and means associable at will with the connectors adapted to make electrical connection therewith and to also serve as a manipulating means for the purpose of moving them.

24. A base having four contacts coacting in pairs, connectors for normally electrically connecting coacting contacts, and means for removably electrically rigidly bridging the connectors and for causing the electrical separation of contacts of a pair.

25. The combination with at least two connectors and their coacting pairs of contacts, of a by-pass bridge adapted to be electrically connected with the two connectors and thus provide a by-pass path for the current flow from one to the other and at least through one, of the connectors when either of the connectors is freed from one of its contacts.

26. An electrical by-pass bridge comprising a conducting portion and an insulating handle portion, the conducting portion being adapted to electrically connect two connectors and the handle portion when manipulated serving to move at least one of the connectors with which it may be connected for testing purposes.

27. A connector for electrically joining a pair of coacting contacts, said connector being provided with a receiving socket and a by-pass bridge adapted for connection to said connector by insertion into said receiving socket.

28. A connector for electrically joining a pair of coacting contacts, and having a hollow head portion to detachably to receive a testing terminal.

29. A base having four contacts coacting in pairs, connectors for normally electrically connecting coacting contacts, and means for removably electrically bridging the connectors and for causing electrical separation of the contacts of a pair.

30. A base having four contacts coacting in pairs, connectors for normally electrically connecting coacting contacts, and means for electrically bridging the connectors and permitting either or both connectors to be electrically freed from one of the contacts of its pair without interrupting the current flow from one to the other of the other contacts of the pairs and through at least one of the connectors.

31. A base having two pairs of contacts, a connector for each pair of contacts, an electrical bridge adapted to directly coact with the connectors and permit of their being freed from one of the contacts of either or both pairs.

32. Contacts arranged in pairs, connectors electrically joining the respective pairs of contacts, in combination with an electrical bridge coacting with the connectors and permitting either or both connectors to be operated to free one of the contacts without interruption of the current flow from one to the other of the other contacts of the pairs, at least one of the connectors being included in the bridging circuit.

33. A meter testing block having an incoming service connection, an outgoing load connection, meter coil connections complemental to the said incoming service and outgoing load connections, and means electrically joining one of the meter connections with one of the other connections, said means carrying a protective device and being adapted to be actuated to electrically free its coacting meter connection and to detachably receive an appurtenance for testing purposes.

34. A meter testing block having an incoming service connection, an outgoing load connection, meter coil connections complemental to the said incoming service and outgoing load connections, and protective device carrying means joining one of the meter connections with one of the other connections and adapted to always carry current from the incoming service to the outgoing load connection and to be actuated to permit the testing of the meter coil, said protective device carrying means being provided with means for the removable association therewith of a testing appurtenance.

35. A meter testing block having an incoming service connection, an outgoing load connection, meter coil connections complemental to said incoming service and outgoing load connections, a connector connecting the incoming service connection with one of the meter connections, a connector connecting the outgoing load connection with the other meter connection, and an electrical protective device associated with one of said connectors, and means coöperative with one of said connectors to permit the testing of the meter coil, and at the same time always insuring current flow from the incoming service to the outgoing load wire through the protective device.

36. A meter testing block having incoming service and outgoing load connections, meter testing connections complemental respectively with said first mentioned connections, an electrical protective device included in the circuit between one of the service or load connections and one of the meter connections, and means adapted to always insure current passing through the protective device and for permitting the electrical freeing of one of the meter connections for testing purposes.

37. A meter testing block having incoming service and outgoing load connections, meter coil connections complemental with said first mentioned connections respectively, said incoming service and outgoing load connections being electrically joined to their coöperating meter coil connections, and an electrical protective device in the joint between one of the meter coil connections and one of the other connections, means associated with one of the joints for insuring current always passing through the protective device from the service to the load connection and for also permitting the block to be arranged for testing purposes.

38. A meter testing block having a connection for either an incoming service or an outgoing load wire, a complemental meter coil terminal connection, a fuse carrying element joining said connections, and independent means associable at will with said element whereby the meter connection is made electrically accessible for testing purposes and after said independent means has been associated with said element.

39. A meter testing block having a connection for either an incoming service or an outgoing load wire, a complemental meter coil terminal connection, said connections being electrically joined by a fuse carrying element, means associable and coactive with said element whereby the meter connection is made electrically accessible for testing purposes, and insuring current flow at all times through the fuse carrying element.

40. A meter testing block having an incoming service connection, an outgoing load connection, meter coil connections complemental to the said incoming service and outgoing load connections, one of the meter connections being joined to one of the other connections and the other meter connection being joined to the other of the other connections, and an electrical protective device included in one of the joints, said protective device being associable with either pair of complemental connections and being provided with means for the removable association therewith of a testing appurtenance.

41. A connector adapted to electrically join a pair of coacting contacts, said connector having substantially parallel contact portions with approximately flat contact faces, and a resilient hollow portion integrally joining said contact portions, the head portion being at least co-extensive with the contact portions lengthwise of the connector.

42. A connector adapted to electrically join a pair of coacting contacts, having substantially parallel contact sides with approximately flat contact faces, and a resilient hollow head portion integrally joining said sides, the connector having means for pivoting the same to a support, said head portion being at least co-extensive with said contact sides lengthwise of the connector.

43. A connector having contact sides and a hollow head integrally and resiliently connecting said sides, one of the latter having a pivot portion, said head portion being at least co-extensive with said contact sides lengthwise of the connector.

44. A protective device carrying connector including an insulating body, contacts on said body to receive a protective device, and contact clips each having substantially flat sides and a resilient hollow head portion integrally joining the same, said contact clips being held to the insulating body at their head portions and being electrically connected with the respective contacts.

45. A screw plug fuse carrying connector comprising an insulating body portion having a chamber, a threaded contact shell in said chamber, a substantially central contact in said chamber, and two contact clips each having substantially flat contact portions and a hollow head portion integrally joining the same, said heads being firmly held to said insulating body portion and said clips being electrically connected with said shell and central contact respectively.

46. An insulating base L-shaped connection and contact members mounted thereon, one branch of each of which serves as a base portion, a washer coacting with and clamped to the base portion of each connection and contact member, a connector electrically joining two of the connection and contact members constituting a coacting pair, said connector being pivotally mounted and being provided with means for interlockably receiving testing means.

47. An insulating base, connection and contact members mounted thereon in pairs, means for clamping a wire to each of the connection and contact members, fused and unfused connectors pivotally joined to one of each pair of connection and contact members with which they respectively coact, said connectors being interchangeable, and provided with means to receive testing devices and to be actuated for the purpose of putting contacts on said block in condition for testing purposes.

48. A meter testing block including an insulating base, five pairs of contacts mounted thereon, two of the pairs being included in the path of one pole of the circuit, two of the pairs being included in the path of another pole of the circuit, and the remaining pair of contacts being adapted to be connected to one or two additional poles, and connectors coacting with each pair of contacts, said connectors being provided with means for the removable association with testing devices and each being movable to electrically free one contact of its pair.

49. A meter testing block comprising an insulating base, contacts mounted on said base, two pairs of said contacts being included in the path of one pole, two pairs being included in the path of another pole and another pair of contacts being adapted to be included in a third pole or to act as terminals, and connectors associated with pairs of contacts and provided with means for receiving testing devices, each connector being movable to electrically free one of its contacts.

50. A by-pass bridge for meter testing comprising a conductor provided with terminals for removable association with connectors of a meter testing block, said conductor being provided between the terminals thereof with an insulating handle to manipulate the connectors when the conductor is associated therewith.

51. An insulating base, a pair of contacts thereon, a connector coacting with said contacts and adapted to open and close the connection between them, means detachably associable with said connector for manipulating it, the contacts and the connector being adapted to be electrically freed when the connector is in the open position for testing purposes.

52. A method of meter testing involving the use of a meter testing block having connectors between its pairs of contacts, comprising inserting an electrical by-pass between and so as to include at least one of a pair of connectors of said block to by-pass the current around the meter coil, moving one of the connector to free a coöperating contact and connecting the meter normally connected with the meter testing block, with appropriate testing devices.

In testimony whereof I affix my signature in presence of two witnesses.

JOSEPH SACHS.

Witnesses:
L. L. MARKEL,
HEATH SUTHERLAND.